United States Patent
Duluk, Jr. et al.

(10) Patent No.: US 9,589,310 B2
(45) Date of Patent: Mar. 7, 2017

(54) METHODS TO FACILITATE PRIMITIVE BATCHING

(75) Inventors: Jerome F. Duluk, Jr., Palo Alto, CA (US); Thomas Roell, Denver, CO (US); Patrick R. Brown, Wake Forest, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1681 days.

(21) Appl. No.: 12/898,624

(22) Filed: Oct. 5, 2010

(65) Prior Publication Data

US 2011/0080416 A1 Apr. 7, 2011

Related U.S. Application Data

(60) Provisional application No. 61/249,550, filed on Oct. 7, 2009.

(51) Int. Cl.
*G06T 1/20* (2006.01)
*G06T 15/00* (2011.01)
*G06F 9/38* (2006.01)

(52) U.S. Cl.
CPC ............. *G06T 1/20* (2013.01); *G06F 9/3851* (2013.01); *G06F 9/3887* (2013.01); *G06T 15/005* (2013.01); *G06T 2210/04* (2013.01); *G06T 2210/52* (2013.01)

(58) Field of Classification Search
CPC ..... G06T 1/20; G06T 15/005; G06T 2210/52; G06T 2210/04; G06F 9/3851; G06F 9/3887
USPC ........................................................ 345/505
See application file for complete search history.

(56) References Cited

U.S. PATENT DOCUMENTS

| | | | |
|---|---|---|---|
| 7,071,935 B1* | 7/2006 | Deering et al. ............... | 345/419 |
| 2005/0001844 A1* | 1/2005 | Naegle .......................... | 345/505 |
| 2005/0046632 A1* | 3/2005 | Chiu et al. .................... | 345/501 |
| 2007/0091102 A1* | 4/2007 | Brothers et al. .............. | 345/506 |
| 2010/0026684 A1* | 2/2010 | Hasselgren et al. .......... | 345/426 |
| 2011/0029982 A1* | 2/2011 | Zhang et al. ................. | 718/105 |

* cited by examiner

*Primary Examiner* — Ke Xiao
*Assistant Examiner* — Kim-Thanh T Tran
(74) *Attorney, Agent, or Firm* — Artegis Law Group, LLP

(57) ABSTRACT

One embodiment of the present invention sets forth a technique for splitting a set of vertices into a plurality of batches for processing. The method includes receiving one or more primitives each containing an associated set of vertices. For each of the one or more primitives, one or more vertices are gathered from the set of vertices, the vertices are arranged into one or more batches, the batch is routed to a processing pipeline line to process each batch as a separate primitive, and the one or more batches are processed to produce results identical to those of processing the entire primitive as a single entity.

18 Claims, 11 Drawing Sheets

METHODS TO FACILITATE PRIMITIVE BATCHING

CROSS-REFERENCE TO RELATED APPLICATIONS

This application claims priority benefit to United States provisional patent application titled, "METHODS TO FACILITATE DRIVER BATCHING" filed on Oct. 7, 2009 and having Ser. No. 61/249,550.

BACKGROUND OF THE INVENTION

Field of the Invention

The present invention generally relates to GPU drivers and, more specifically, to batching vertices of a primitive prior to routing the vertices to a GPU.

Description of the Related Art

In conventional graphics processing, the OpenGL application programming interface (API) includes an explicit API-visible Begin command and End command that encompass primitive draw commands that cause a graphics processor to render primitives. A driver receives the Begin command and subsequently receives a stream of vertices that comprise the primitives to be rendered followed by the End command. The driver may want to arrange the vertices specified by the application into regular batches for optimal processing by parallel graphics processing units (GPUs) and for other performance optimizations. The driver is unaware, however, of the length of the stream of vertices, which causes a number of issues.

For example, a driver in the current art might store the vertex data specified by the application in a vertex buffer that can be directly accessed by graphics hardware. Instead of passing the vertex data directly to the graphics processor, the driver instead passes a single index per vertex, which will be used to identify the location of that vertex's data in the vertex buffer. While building these batches, there are several good reasons for the driver to want to limit the batch size. Such a limit will permit smaller allocations for the vertex buffer and reduces data transfer by passing compact indices to the GPU. In the current art, if each vertex is indexed by sixteen bits, and the stream eventually exceeds 65,536 vertices, then each index of received vertices included in the stream must be updated to thirty-two bits so that the driver may properly index the remaining vertices included in the stream. Such increases require an increased amount of storage space and also reduce the effectiveness of hardware that is optimally configured to interact with sixteen-bit indices.

Even in cases where the vertices specified in a primitive are specified in regular form and with a vertex count known when the primitive is first specified, splitting large primitives into batches may still be desirable. Batching permits optimizations that skip processing of portions of the primitive that are not visible to the end-user, and also allows for state changes in the middle of a primitive.

Accordingly, what is needed in the art is a technique for transforming a set of primitives into a collection of batches with a reduced number of vertices in each batch, while still preserving the semantics of the original API command stream.

SUMMARY OF THE INVENTION

One embodiment of the present invention sets forth a technique for splitting a set of vertices into a plurality of batches for processing. The method includes receiving one or more primitives each containing an associated set of vertices. For each of the one or more primitives, one or more vertices are gathered from the set of vertices, the vertices are arranged into one or more batches, the batch is routed to a processing pipeline line to process each batch as a separate primitive, and the one or more batches are processed to produce results identical to those of processing the entire primitive as a single entity.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
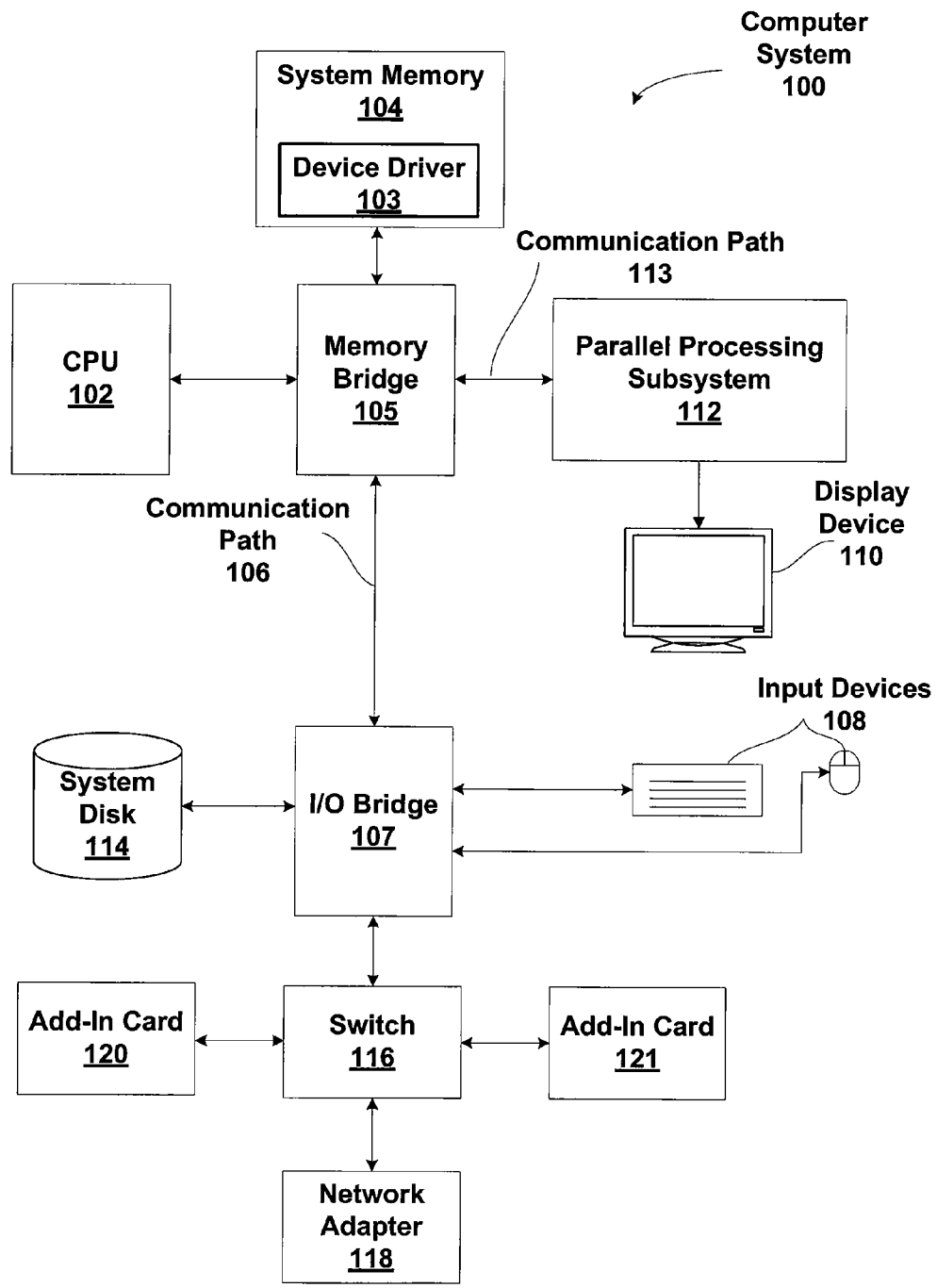
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
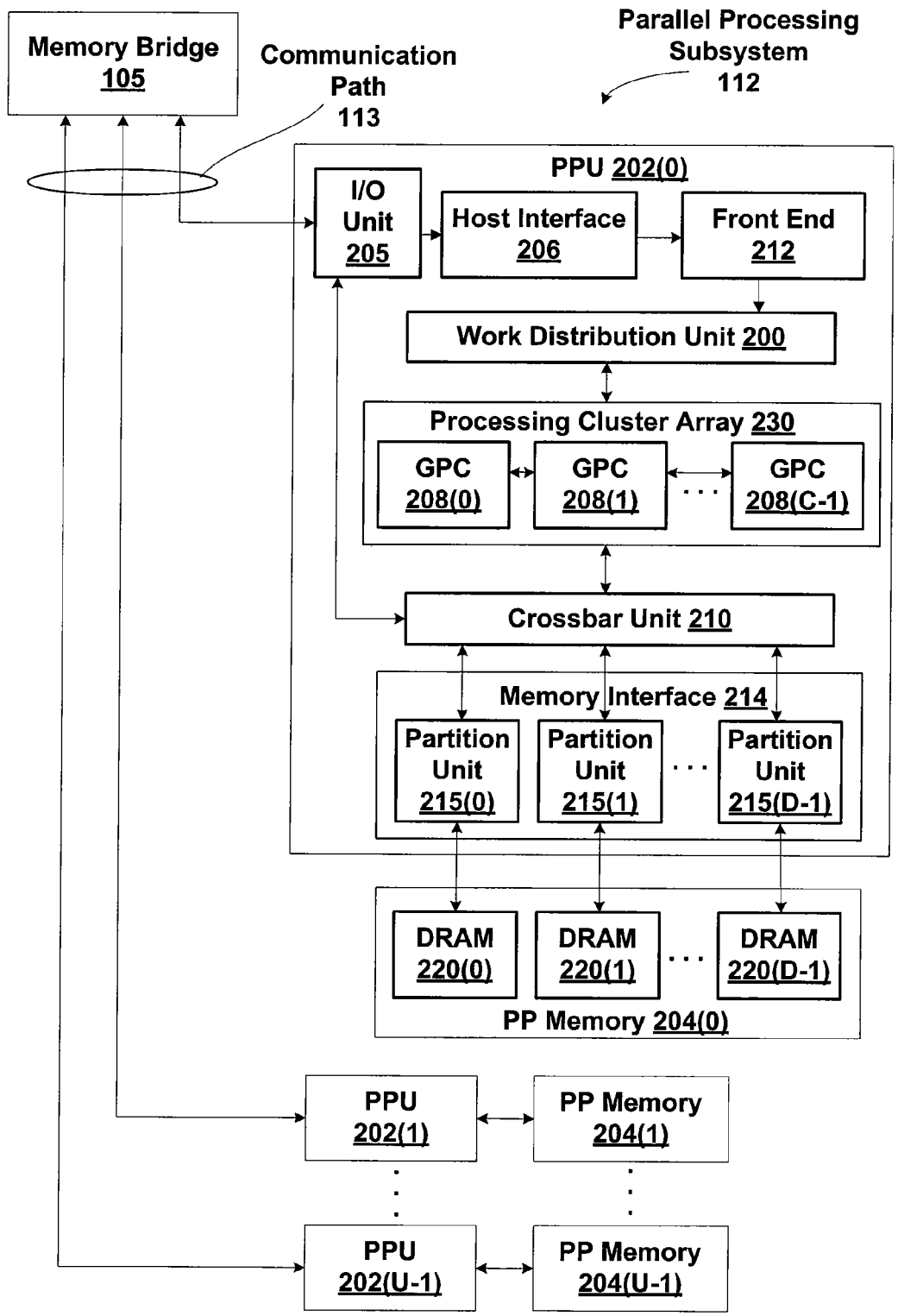
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
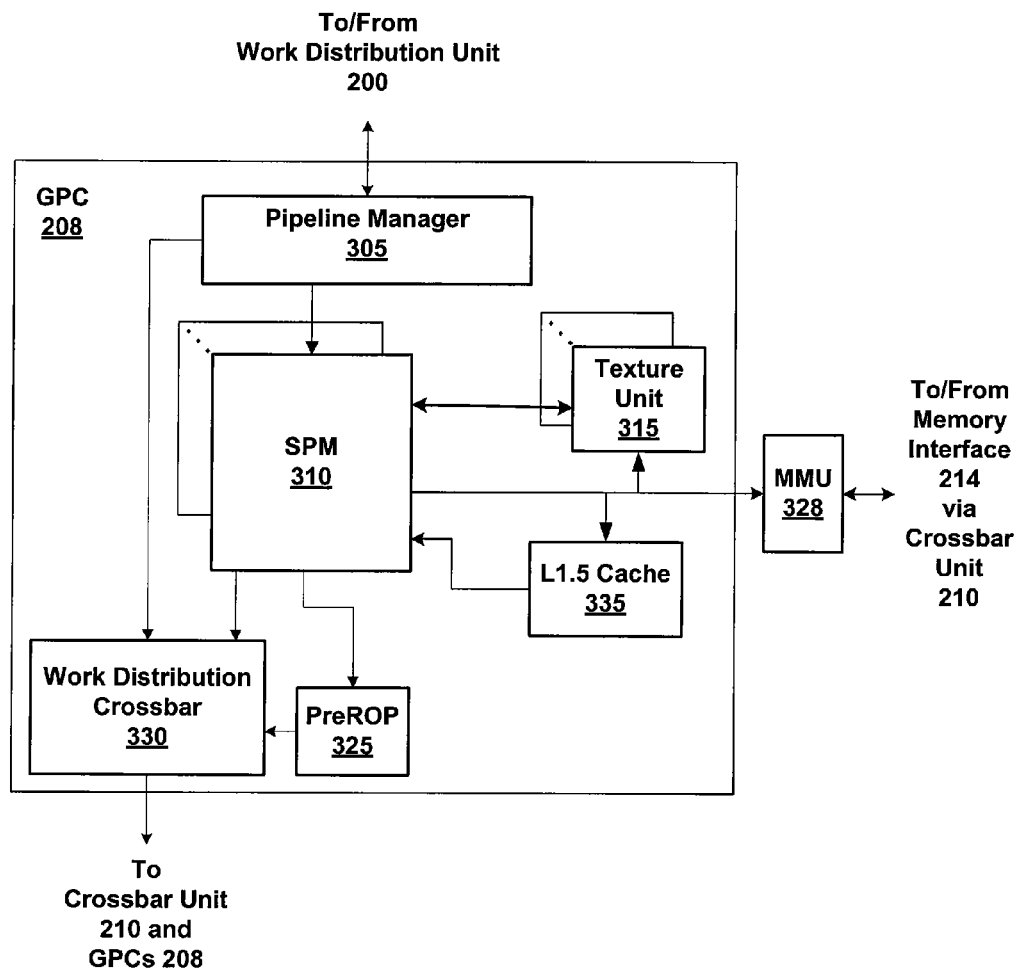
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≥1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
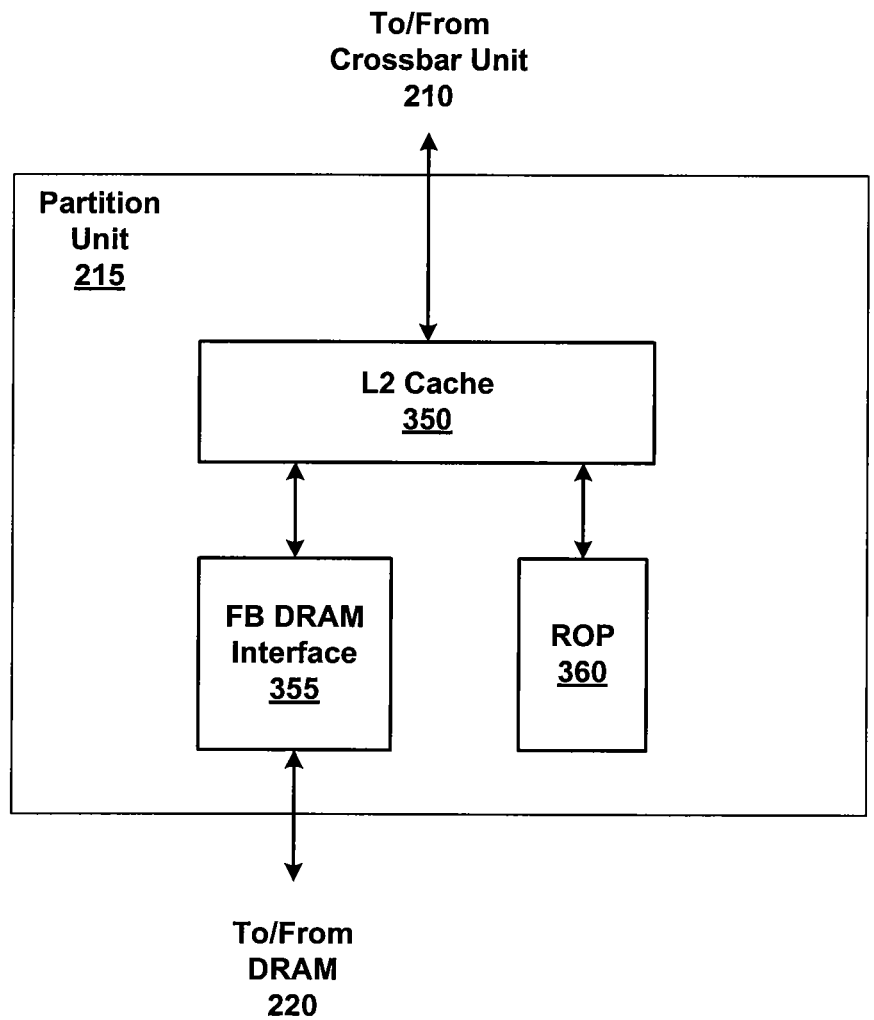
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of the thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
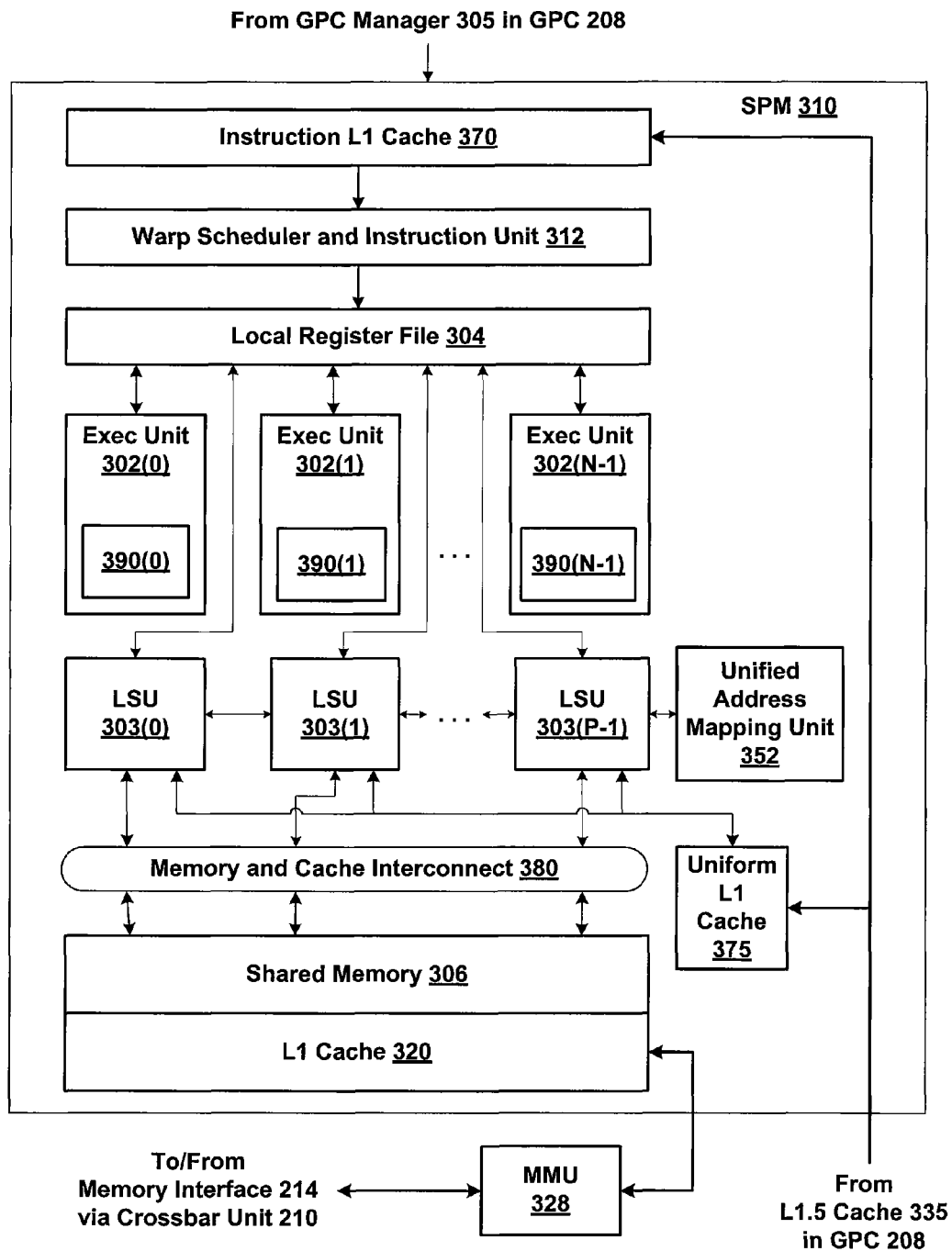
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

The L1 Cache 320 in each SPM 310 can be used to cache private per-thread local data and also per-application global data. In some embodiments, the per-CTA shared data may be cached in the L1 cache 320. The LSUs 303 are coupled to a uniform L1 cache 375, the shared memory 306, and the L1 cache 320 via a memory and cache interconnect 380. The uniform L1 cache 375 is configured to receive read-only data and constants from memory via the L1.5 Cache 335.

Graphics Pipeline Architecture

Figure 4:
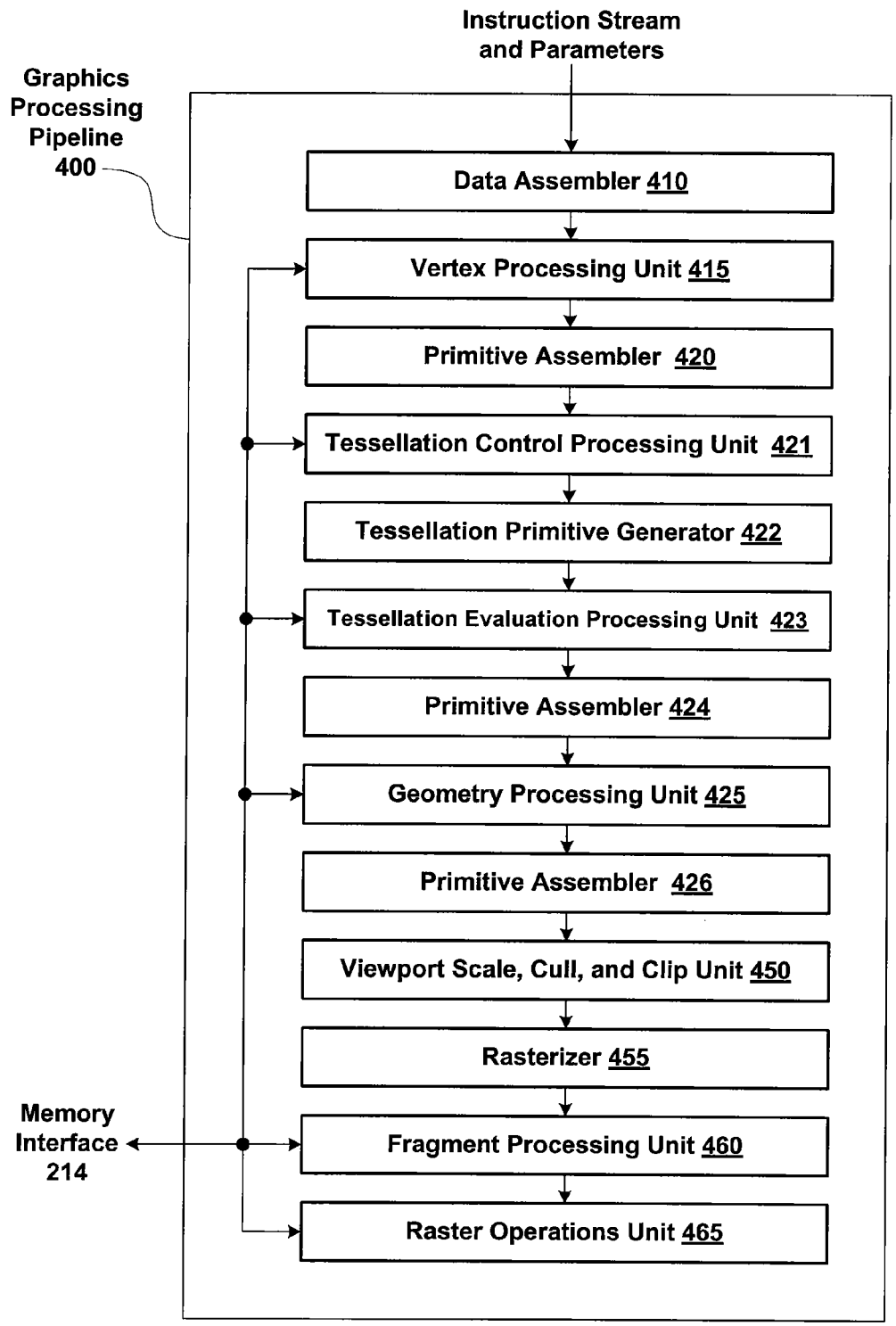
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a tessellation control processing unit 421, a tessellation evaluation processing unit 423, a geometry processing unit 425, and a fragment processing unit 460. The functions of data assembler 410, primitive assemblers 420, 424, 426, tessellation primitive generator 422, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by tessellation control processing unit 421. Graphics primitives include triangles, line segments, points, patches, and the like.

The tessellation control processing unit 421 treats the input vertices as control points for a geometric patch and transforms these control points from the patch's input represenation, often called the patch's basis, into a representation suitable for efficient surface evaluation by the tessellation evaluation shader 423. The tessellation control processing unit 421 also computes tessellation factors for edges of geometric patches. A tessellation factor applies to a single edge and quantifies a view-dependent level of detail associated with the edge. A tessellation primitive generator 422 is configured to receive the tessellation factors for edges of a patch and to tessellate the patch into multiple geometric primitives such as line, triangle, or quadrilateral primitives, which are transmitted to a tessellation evaluation processing unit 423. The tessellation evaluation processing unit 423 operates on parameterized coordinates of the subdivided patch to generate a surface representation and vertex attributes for each vertex associated with the geometric primitives.

Primitive assembler 424 receives vertex attributes from tessellation evaluation processing unit 423, reading stored vertex attributes, as needed, and constructs graphics primitived for processing by geometry processing unit 425. Geometry processing unit 425 is a programmable execution unit that is configured to execute geometry shader programs, transforming graphics primitives received from primitive assembler 424 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to primitive assembler 426, which receives the parameters and vertices from the geometry processing unit 425, reading stored vertex attributes, as needed, and constructs graphics primitives for processing by a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455.

Rasterizer 455 scan converts the new graphics primitives and outputs fragments and coverage data to fragment processing unit 460. Additionally, rasterizer 455 may be configured to perform z culling and other z-based optimizations.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Driver Batching

The present invention introduces the novel concept of adding four "split modes" to the Begin command passed to the parallel processing subsystem 112: NORMAL_BEGIN_NORMAL_END, NORMAL_BEGIN_OPEN_END, OPEN_BEGIN_OPEN_END, and OPEN_BEGIN_NORMAL_END. In one embodiment, the device driver 103 receives a specification of vertex data that comprises one or more primitives, each comprising a Begin command, one or more vertices worth of vertex data, and a final End command. Upon receipt of the first Begin command, the device driver 103 begins collecting the vertex data, and may be interrupted prior to receiving all of the vertex data, to send the thus-far collected vertex data—referred to herein as a "batch"—to the parallel processing subsystem 112. This technique may be realized through specification of a split mode as part of the data provided to a Begin command implemented by the parallel processing subsystem 112, described here as "BEGIN.OPEN_BEGIN_OPEN_END." Appending such split modes to a Begin command allows for the device driver 103 to route a batch of the vertex data to the parallel processing subsystem 112, thereby segmenting the vertex data into batches that are processed independently by the parallel processing subsystem 112, but having the same overall result as if all the vertices were processed at once.

In the embodiments described herein, the NORMAL_BEGIN_NORMAL_END split mode is used to implement a typical Begin and End command sequence, where all of the vertex data is entirely gathered into a single batch and is routed to the parallel processing subsystem 112. The NORMAL_BEGIN_OPEN_END split mode is used to specify the first batch of a Begin and End command sequence, where the vertex data are routed to the parallel processing subsystem 112 in at least two batches.

The OPEN_BEGIN_OPEN_END split mode is used to specify batches in the middle of a Begin and End command sequence. The OPEN_BEGIN_OPEN_END split mode allows for batching the vertex data into three or more batches that are routed to the parallel processing subsystem 112. Finally, the OPEN_BEGIN_NORMAL_END split mode is used to specify a final batch of the vertex data, which is also routed to the parallel processing subsystem 112.

The split mode controls the handling of line stipple and edges. For LINES, LINE_STRIP and LINE_LOOP primitives, as well as POLYGON primitives drawn as outlines, OPEN_BEGIN_OPEN_END and OPEN_BEGIN_NORMAL_END split modes do not reset the line stipple phase at the beginning of the batch. For POLYGON primitives drawn as outlines NORMAL_BEGIN_OPEN_END forces the last edge to be treated an interior edge during rasterization, OPEN_BEGIN_OPEN_END forces the first and last edge to be treated as interior edges, and lastly OPEN_BEGIN_NORMAL_END forces the first edge to be treated as an interior edge. Marking these selected edges as interior prevents the parallel processing subsystem from drawing diagonal in the interior of polygon. NORMAL_BEGIN_NORMAL_END treats both aspects in conformance to prior art. This special support in the parallel processing subsystem 112 for the three novel split modes ensures that primitives decomposed into batches are drawn identically to those drawn in the non-batched prior art method.

The OpenGL application programming interface (API) includes shader-visible unique identification numbers, referred to herein as "VertexID" and "PrimitiveID". Each API visible draw command associates each vertex either with a sequentially generated "vertexID", reset to zero at each Begin and DrawArrays, or set to the user-specified index value passed in via DrawElements. In addition, each individual primitive output by Primitive Assembler 424 is associated with a sequentially increasing "PrimitiveID" that is reset to zero at the beginning of each API-visible primitive.

In the embodiments described herein commands "SetVertexID" and "AddToVertexID" are added to control the generation of the previously described "VertexID" for OPEN_BEGIN_NORMAL_END and OPEN_BEGIN_OPEN_END split modes. Said "SetVertexID" does set the current "VertexID" counter value whereas said "AddToVertexID" adds a value to the current "VertexID" counter. Such commands allow the device driver 103 to omit sending non-visible batches to the Parallel Processing Subsystem 112 while still keeping the shader-visible "VertexID" consistent. A non-visible batch is a batch wherein the associated primitives do not affect the final rendered image.

Furthermore, said "VertexID" mechanism is supplemented by a "SetCopyVertexID" command that allows an auxiliary attribute value to be included in each vertex overriding the generated "VertexID". The device driver 103 would make use of said mechanism to remap API visible "VertexID" values passed in via DrawElements in such a way that despite batching the shader visible, "VertexID" is still consistent. Such a processing is useful when, for example, converting the VertexID from a 32-bit address space to a 16-bit address space, where the batches with 16-bit indices would use vertex index numbers smaller than the original ones provided by the application.

In the embodiments described herein, commands "SetPrimitiveID" and "AddToPrimtiveID" are added to control the generation of the previously described "PrimitiveID" for OPEN_BEGIN_NORMAL_END and OPEN_BEGIN_OPEN_END split modes. Said "SetPrimitiveID" does set the current "PrimitiveID" counter value whereas said "AddPrimitiveID" adds a value to the current "PrimitiveID" counter. Such commands allow the device driver 103 to omit sending non-visible batches to the parallel processing subsystem 112 while still keeping the shader visible "PrimitiveID" consistent with the original command stream.

Additionally, the embodiments described herein include a special "primitive ID" mode in the Begin command sent to the parallel processing subsystem 112. The supported modes are "FIRST", where the current "PrimitiveID" counter is reset to zero at the beginning of the new primitive, and "UNCHANGED", where the "PrimitiveID" counter retains its current value. The device driver 103 uses the primitive ID mode "FIRST" for the NORMAL_BEGIN_NORMAL_END and NORMAL_BEGIN_OPEN_END split modes, and mode "UNCHANGED" for the OPEN_BEGIN_NORMAL_END and OPEN_BEGIN_OPEN_END split modes. Using the "UNCHANGED" mode allows the counter on all batches other than the first of a primitive allows the correct counter value to be maintained for these subsequent batches, even if no batches are omitted by the device driver 103.

Figure 5A:
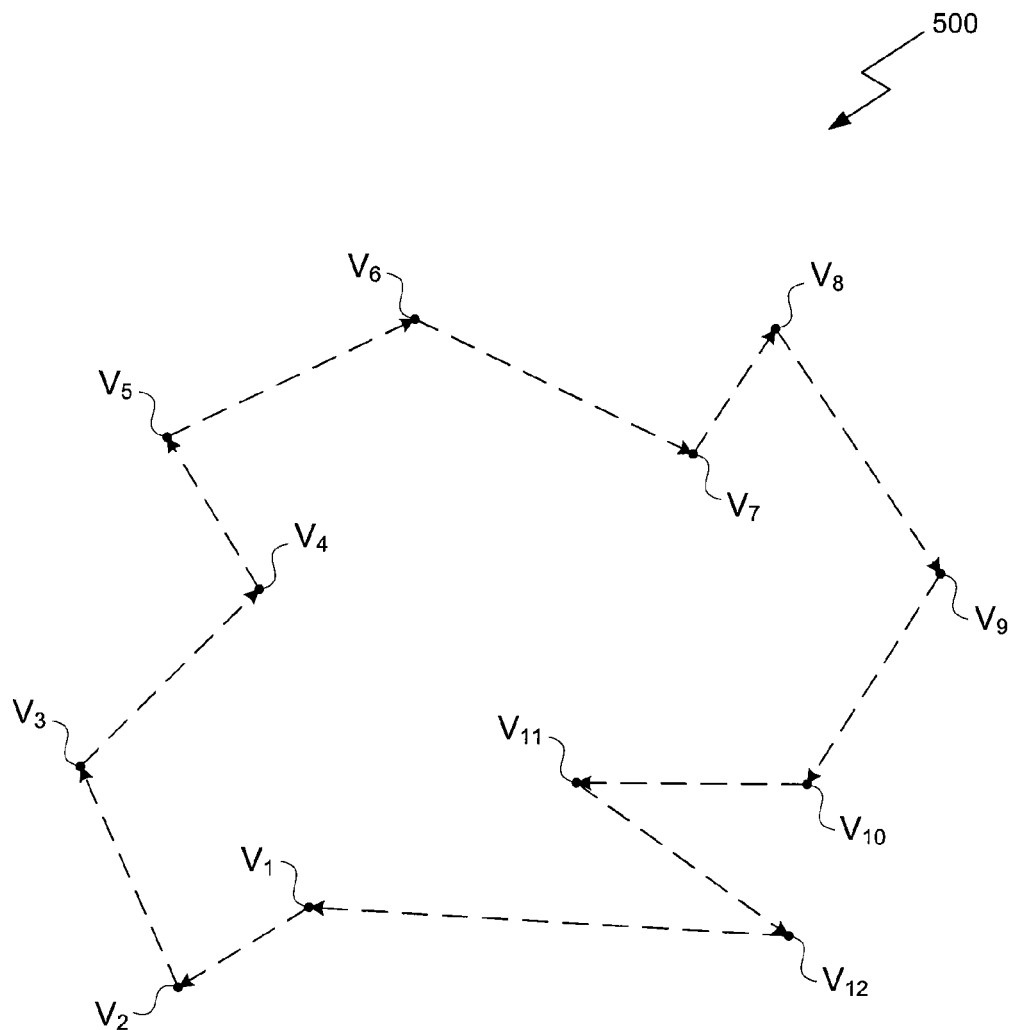
FIGS. 5A-5D illustrates batching and processing vertex data that comprises a line loop, according to one embodiment of the present invention.

FIGS. 5A-5D illustrates batching and processing vertex data that comprises an example line loop 500, according to one embodiment of the present invention. As shown in FIG. 5A, the line loop 500 is comprised of vertices $v_1$ through $v_{12}$, where the vertex $v_1$ is linked to the vertex $v_2$, the vertex $v_2$ is linked to the vertex $v_3$, etc., and where the vertex $v_{12}$ is implicitly linked back to the vertex $v_1$, as commonly known to those having skill in the art. Each of the vertices $v_1$-$v_{12}$ may be viewed as the specification of vertex data described above.

Figure 5B:
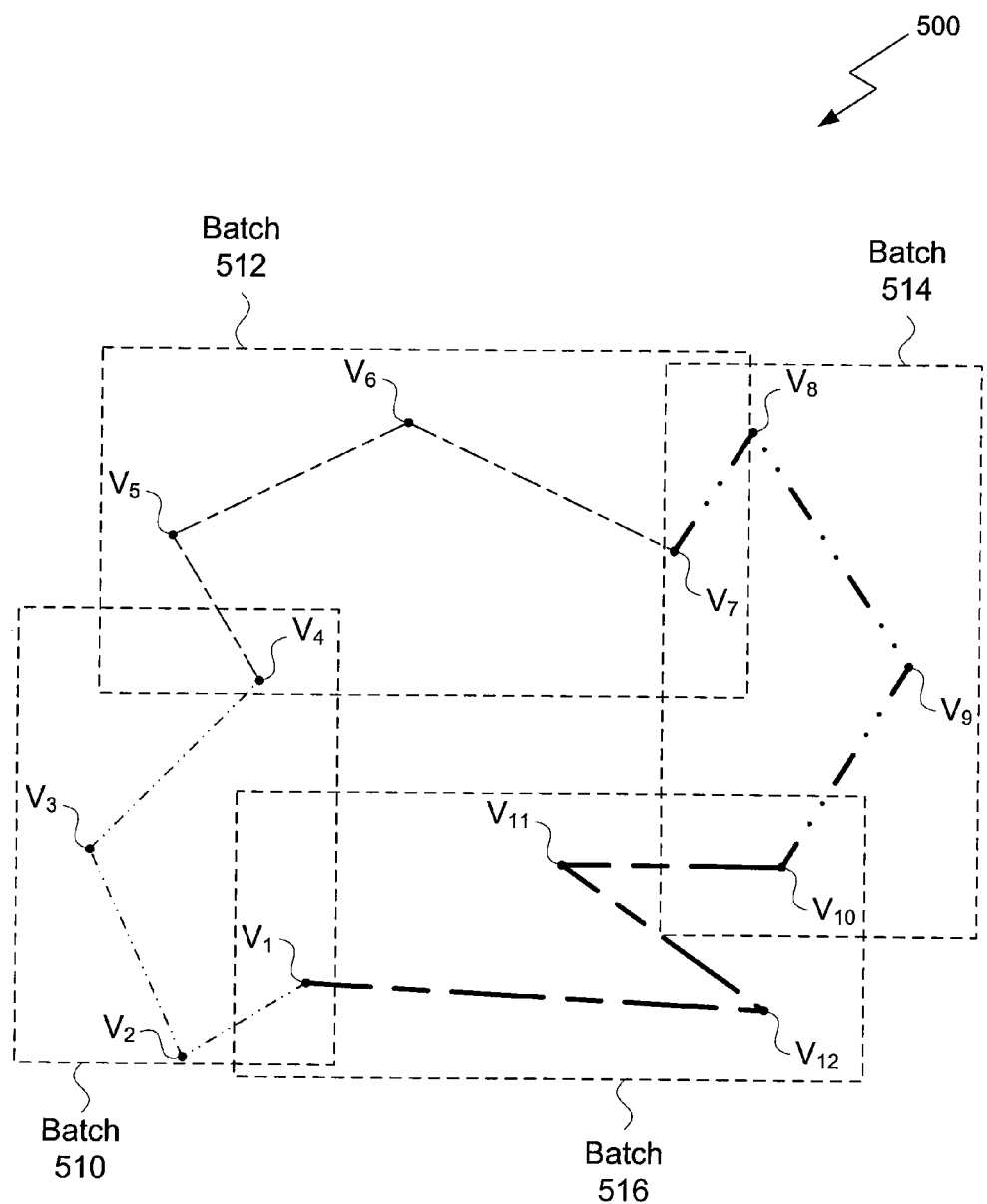

FIG. 5B continues the example shown in FIG. 5A and illustrates four batches: a batch 510, a batch 512, a batch 514, and a batch 516. As shown, each batch includes a subset of the vertices $V_1$-$V_{12}$. Such batches may be configured using four split-mode Begin and END command sequences. For example, to create the first batch 510, a BEGIN.NORMAL_BEGIN_OPEN_END command is used by the device driver 103 to gather the vertices $V_1$-$V_4$ and, upon completion of gathering, route the batch 510 to the parallel processing subsystem 112 for processing. Next, to create the batch 512, a BEGIN.OPEN_BEGIN_OPEN_END command is used by the device driver 103 to gather the vertices $V_4$-$V_7$ and, upon completion of gathering, route the batch 512 to the parallel processing subsystem 112 for processing.

Further, to create the batch 514, a BEGIN.OPEN_BEGIN_OPEN_END command is used by the device driver 103 to gather the vertices $V_7$-$V_{10}$ and, upon completion of gathering, route the batch 514 to the parallel processing subsystem 112 for processing. Finally, to create the batch 516, a BEGIN.OPEN_BEGIN_NORMAL_END command is used by the device driver 103 to gather the vertices $V_{10}$-$V_{12}$ and $V_1$ and, upon completion, route the batch 516 to the parallel processing subsystem 112 for processing.

Figure 5C:
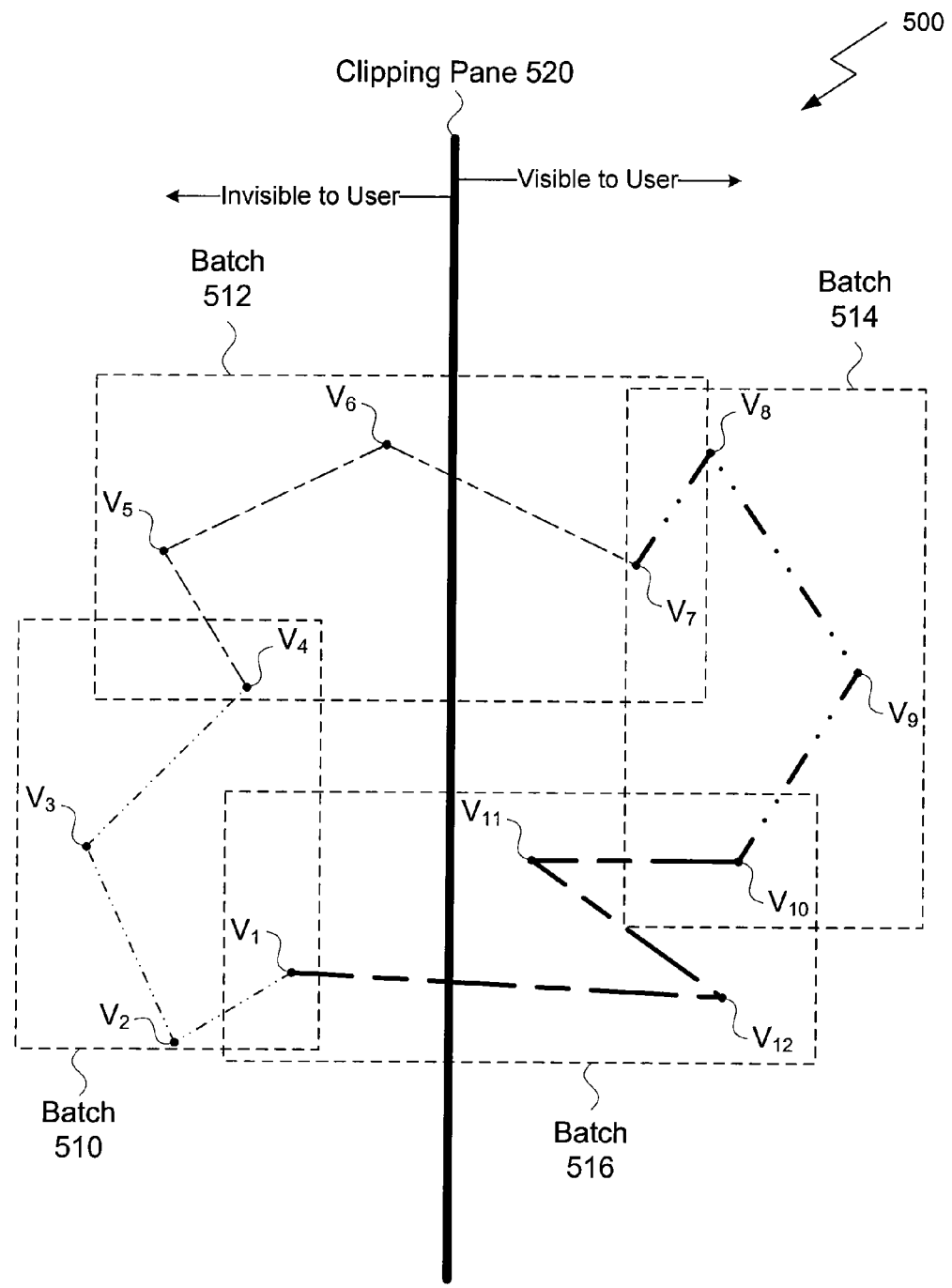

FIG. 5C continues the example shown in FIGS. 5A-5B and illustrates a clipping plane 520. Clipping planes split the coordinate systems into a portion visible to the viewer and a portion invisible to the viewer, as is commonly known to those having skill in the art. In this example, only the right half of the diagram is considered visible. Based on the batching sequence described above in FIG. 5B, batch 510 and batch 512 are non-visible batches. The device driver 103 receives and the vertices and gathers the vertices into batches in the following order: batch 510, batch 512, batch 514, and batch 516. Here, the clipping plane 520 separates the batches into three different portions, where the batch 510 is fully invisible to a user, batches 512 and 516 are partially visible to a user, and batch 514 is fully visible to the user. The device driver 103 may determine that the batch 510 is not visible to the user by performing calculations known to those having skill in the art. For example, the device driver 103 could determine that the batch 510 is not visible to the user based on his or her current viewpoint. Alternately, the device driver 103 might determine that one or more previously rendered graphics primitives was drawn in front of batch 512 and fully covers what would be drawn by batch 512 (not depicted). Accordingly, in either of these examples, the batch 510 and the batch 512 may be discarded by the device driver 103, thereby eliminating the draw commands that would otherwise be processed when using prior art techniques. Since, in this example, the batch 514 and the batch 516 are fully or partially visible, each is processed by the parallel processing subsystem 112 according to the received one or more draw commands.

Figure 5D:
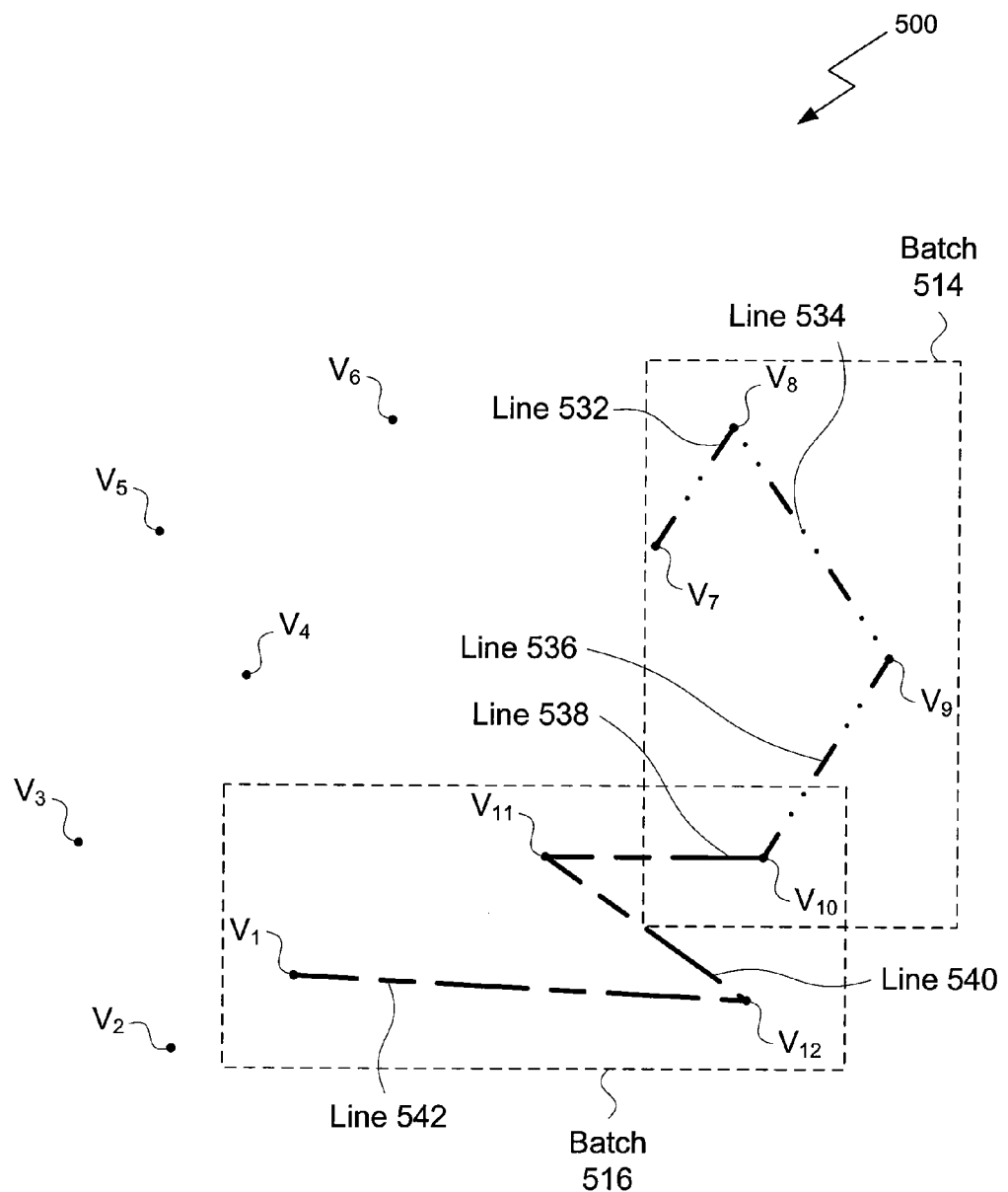

FIG. 5D continues the example shown in FIGS. 5A-5C and illustrates the result of executing the one or more draw commands that correspond to the batch 514 and the batch 516. For the purposes of illustration, assume that each of the one or more draw commands instruct the parallel processing subsystem 112 to draw a patterned line segment between each of the connected vertices $V_7$-$V_{12}$ and $V_1$ included in the batch 514 and the batch 516. When rendering line strips or loops with a pattern such as dashes, the pattern must appear continuous over the collection of line segments, as is commonly known to those having skill in the art. Thus, as shown in FIG. 5D, a line 532 is drawn between the vertex $V_7$ and the vertex $V_8$, line 534 is drawn between the vertex $V_8$ and the vertex $V_9$, and line 536 is drawn between the vertex $V_9$ and the vertex $V_{10}$, thereby completing the processing of the batch 514. Additionally, line 538 is drawn between the vertex $V_{10}$ and the vertex $V_{11}$, a line 540 is drawn between the vertex $V_{11}$ and the vertex $V_{12}$, and line 542 is drawn between the vertex $V_{12}$ and the vertex $V_1$, thereby completing the processing of the batch 516.

When the device driver 103 specifies batch 516, it provides the four vertices $V_{10}$, $V_{11}$, $V_{12}$, and $V_1$, comprising three lines (538, 540, and 542). When drawing such a pattern line strip, lines 540 and 542, the line pattern continues to match the patterns at the end of line 538 and 540, respectively. For normal line strip primitives specified in the OpenGL API, the line pattern is always set to a default initial state when the first line (line 538 in this example) is drawn. However, because batch 516 was specified with BEGIN.OPEN_BEGIN_NORMAL_END, the parallel processing subsystem 112 treats the batch as a continuation of batch 514. As a result, line 538 will drawn with the line patterned continued to match the pattern at the end of line 536 from batch 514.

FIGS. 5A-5D illustrates the advantages of the split mode Begin commands described herein. Prior art methods require that the device driver 103 includes all of the vertices $V_1$-$V_{12}$ into a single batch when routing the vertices to the parallel processing subsystem 112 for processing. Thus, each of the vertices $V_1$-$V_{12}$ must first be processed regardless of whether they are visible to the user. The present invention enables the device driver 103 to separate the vertices $V_1$-$V_{12}$ into one or more batches that are sequentially routed to the parallel processing subsystem 112. The device driver 103 may omit sending some batches to the parallel processing subsystem 112. Alternatively, the parallel processing subsystem 112 can receive all the batches and may determine whether to discard each batch based on various criteria (e.g., visibility to the user), thereby optimizing the efficiency of processing the vertices $V_1$-$V_{12}$.

Figure 6:
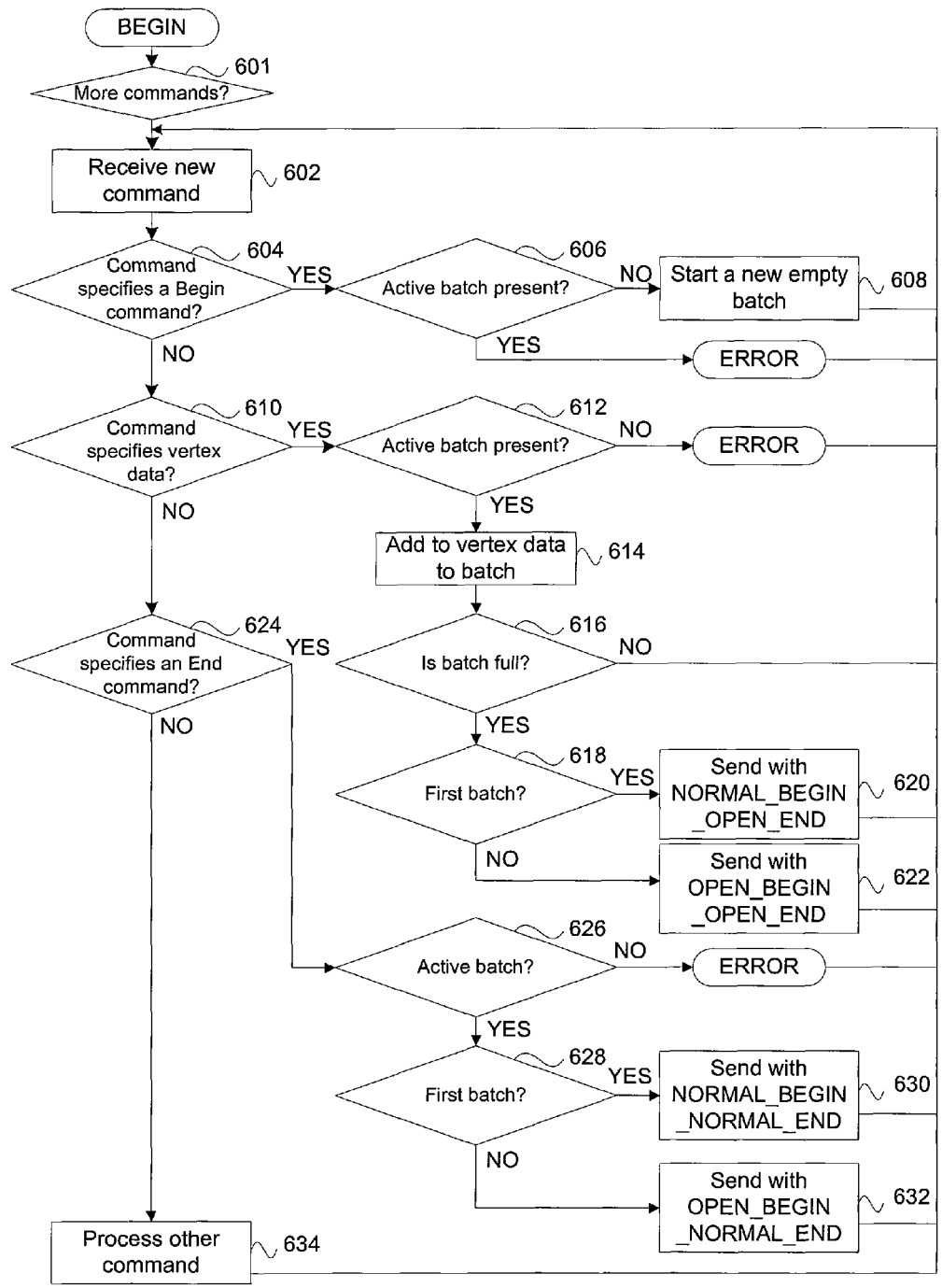
FIG. 6 is a flow diagram of method steps 600 for batching vertex data using Begin command split modes, according to one embodiment of the present invention.

FIG. 6 is a flow diagram of method steps 600 for batching vertex data using Begin command split modes, according to one embodiment of the present invention. Although the method steps are described in conjunction with the systems of FIGS. 1, 2, 3A, 3B, 3C and 4, persons skilled in the art will understand that any system configured to perform the method steps, in any order, is within the scope of the inventions. The method steps 600 are preferably performed by the device driver 103. The method begins at step 601, where the device driver 103 determines whether commands are present. At step 602, the device driver 103 receives a command from an application program. At step 604, the device driver 103 determines if the command is a Begin command. Here, the term command can mean a group of commands received from the application program that work together as one logical command.

At step 606, the device driver 103 determines if there is already a currently active batch containing vertex data. If there is, the application is attempting to start a new primitive before completing the current one, which is treated as an error. If there is no currently active batch, processing continues at step 608 where a new empty batch is started. After processing the Begin command, the device driver 103 examines the next command from the application at step 602.

At step 610, the device driver 103 determines if the command specifies new vertex data. If so, the device driver determines at step 612 whether there is a currently active batch. If no active batch exists, the application is specifying vertex data outside a primitive, which is considered an error. The vertex data specified are ignored. Otherwise, the new vertex data are added to the currently active batch in step 614. In step 616, the device driver 103 determines if the active batch is full after the addition of the new vertex data. If not, processing continues at step 602 by examining the next command. If the batch is full, the device driver 103 determines at step 618 if the active batch is the first batch of the primitive.

If the active batch, now full, is the first batch of the primitive, processing continues at step 620, where the device driver 103 sends the batch to the parallel processing subsystem 112 using the NORMAL_BEGIN_OPEN_END split mode and the FIRST primitive ID mode. After sending the batch, the currently active batch is reset, and depending on the primitive type, up to two vertices are carried over from the previous batch by the device driver 103 to start the new batch. For example, in the line loop in FIG. 5B, the last vertex of the old batch is used as the first vertex of the new batch to ensure that the line loop drawn in batches is continuous. Processing continues with the next command at step 602. When processing such batches, the parallel processing subsystem 112 will reset the stipple phase and the "PrimitiveID" counter, and for POLYGON primitives, mark the last vertex of the batch as starting an internal edge.

If the active batch, now full, is not the first batch of the primitive, processing continues at step 622, where the device driver 103 sends the batch to the parallel processing subsystem 112 using the OPEN_BEGIN_OPEN_END split mode and the UNCHANGED primitive ID mode. After sending the batch, the currently active batch is reset, and depending on the primitive type, up to two vertices are carried over from the previous batch by the device driver 103 to start the new batch as described for step 620. When processing such batches, the parallel processing subsystem 112 will leave the stipple phase and the "PrimitiveID" counter unchanged, and for POLYGON primitives, mark both the first and the last vertex of the batch as starting an internal edge.

Processing continues with the next command at step 602.

At step 624, the device driver 103 determines if the command is an End command. If so, step 626 determines if there is currently an active batch. If there is no active batch, the application is attempting to end a primitive that has not been started, which is an error. At step 628, the device driver 103 determines if the active batch is the first batch of the primitive.

If the active batch is the first batch of the primitive, processing continues at step 630, where the device driver 103 sends the batch to the parallel processing subsystem 112 using the NORMAL_BEGIN_NORMAL_END split mode and the FIRST primitive ID mode. When processing such batches, the parallel processing subsystem 112 will reset the stipple phase and the "PrimitiveID" counter. After sending the batch, processing continues with the next command at step 602.

If the active batch is the first batch of the primitive, processing continues at step 630, where the device driver 103 sends the batch to the parallel processing subsystem 112 using the OPEN_BEGIN_NORMAL_END split mode and the UNCHANGED primitive ID mode. When processing such batches, the parallel processing subsystem 112 will leave the stipple phase and the "PrimitiveID" counter unchanged, and will mark the first vertex of the batch as starting an internal edge. After sending the batch, processing continues with the next command at step 602, assuming that more commands are present, as determined in step 601.

As an alternative to having Begin command with four split modes, an alternate embodiment can have a Begin command with two split modes, NORMAL and OPEN, and an End command with two split modes, NORMAL and OPEN. The End command with split modes is sent by the device driver 103 when a batch is full, before starting a new batch with a Begin, thereby achieving the same ability to split vertices into batches.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A computer-implemented method for splitting a set of vertices into a plurality of batches for processing, the method comprising:
   receiving one or more primitives, wherein each primitive includes an associated set of vertices;
   for each of the one or more primitives:
      generating a beginning batch that includes one or more vertices associated with the primitive,
      generating a set of intermediate batches, wherein each intermediate batch includes one or more vertices associated with the primitive,
      generating an end batch that includes one or more vertices associated with the primitive,
      routing the beginning batch, the set of intermediate batches, and the end batch to a processing pipeline to process each batch as a separate primitive, and
      wherein the beginning batch, the set of intermediate batches, and the end batch are processed to produce results substantially the same as those of processing the entire primitive as a single entity.

2. The method of claim 1, further comprising:
transmitting a first begin command to the processing pipeline prior to transmitting the beginning batch to the processing pipeline;
transmitting a different second begin command to the processing pipeline prior to transmitting each of the intermediate batches included in the set of intermediate batches to the processing pipeline; and
transmitting a third begin command to the processing pipeline prior to transmitting the end batch to the processing pipeline.

3. The method of claim 1, wherein:
the first begin command includes an annotation configured to specify to the processing pipeline that the beginning batch is an earliest batch associated with the primitive;
each second begin command includes an annotation configured to specify to the processing pipeline that the intermediate batch corresponding to the second begin command is neither the earliest batch nor a latest batch associated with the primitive; and
the third begin command includes an annotation configured to specify to the processing pipeline that the end batch is the latest batch associated with the primitive.

4. The method of claim 1, wherein one or more vertices of a primitive are assigned to multiple batches.

5. The method of claim 1, wherein the processing of a plurality of batches maintains a continuous line stipple pattern between batches.

6. The method of claim 1, wherein the processing of a plurality of batches discards internal edges at batch boundaries when a primitive is drawn as a polygonal outline.

7. The method of claim 1, wherein the processing of a plurality of batches produces vertex identification counters matching those generated when processing the primitive as a single entity.

8. The method of claim 1, wherein one or more batches are determined not to be visible and discarded without routing to the processing pipeline.

9. A non-transitory computer-readable storage medium storing instructions that, when executed by a processor, cause a computing device to split a set of vertices into a plurality of batches for processing, by performing the steps of:
receiving one or more primitives, wherein each primitive includes an associated set of vertices;
for each of the one or more primitives:
generating a beginning batch that includes one or more vertices associated with the primitive,
generating a set of intermediate batches, wherein each intermediate batch includes one or more vertices associated with the primitive,
generating an end batch that includes one or more vertices associated with the primitive, and
routing the beginning batch, the set of intermediate batches, and the end batch to a processing pipeline to process each batch as a separate primitive,
wherein the beginning batch, the set of intermediate batches, and the end batch are processed to produce results substantially the same as those of processing the entire primitive as a single entity.

10. The non-transitory computer-readable storage medium of claim 9, further storing instructions that cause the processor to:
transmit a first begin command to the processing pipeline prior to routing the beginning batch to the processing pipeline;
transmit a different second begin command to the processing pipeline prior to routing each of the intermediate batches in the set of intermediate batches to the processing pipeline; and
transmit a third begin command to the processing pipeline prior to routing the end batch to the processing pipeline.

11. The non-transitory computer-readable storage medium of claim 9, wherein:
the first begin command includes an annotation configured to specify to the processing pipeline that the beginning batch is an earliest batch associated with the primitive;
each second begin command includes an annotation configured to specify to the processing pipeline that the intermediate batch corresponding to the second begin command is neither the earliest batch nor a latest batch associated with the primitive; and
the third begin command includes an annotation configured to specify to the processing pipeline that the end batch is the latest batch associated with the primitive.

12. The non-transitory computer-readable storage medium of claim 9, wherein one or more vertices of a primitive are assigned to multiple batches.

13. The non-transitory computer-readable storage medium of claim 9, wherein the processing of a plurality of batches maintains a continuous line stipple pattern between batches.

14. The non-transitory computer-readable storage medium of claim 9, wherein the processing of a plurality of batches discards internal edges at batch boundaries when a primitive is drawn as a polygonal outline.

15. The non-transitory computer-readable storage medium of claim 9, wherein the processing of a plurality of batches produces vertex identification counters matching those generated when processing the primitive as a single entity.

16. The non-transitory computer-readable storage medium of claim 9, wherein one or more batches are determined not to be visible and discarded without routing to the processing pipeline.

17. A computing device configured to split a set of vertices into a plurality of batches for processing, the computing device comprising:
a host processor coupled to a main memory, wherein the main memory stores a software driver that, when executed by the host processor, causes the host processor to:
receive one or more primitives, wherein each primitive includes an associated set of vertices;
for each of the one or more primitives:
generate a beginning batch that includes one or more vertices associated with the primitive,
generate a set of intermediate batches, wherein each intermediate batch includes one or more vertices associated with the primitive,
generate an end batch that includes one or more vertices associated with the primitive,
route the beginning batch, the set of intermediate batches, and the end batch to a processing pipeline to process each batch as a separate primitive; and
a parallel processing unit configured to, for each of the one or more primitives, process the one or more batches to produce results substantially the same as to those of processing the entire primitive as a single entity.

18. The computing device of claim 17, wherein the software driver is further configured to cause the host processor to:

transmit a first begin command to the processing pipeline prior to routing the beginning batch to the processing pipeline;

transmit a different second begin command to the processing pipeline prior to routing each of the intermediate batches included in the set of intermediate batches to the processing pipeline; and transmit a third begin command to the processing pipeline prior to routing the end batch to the processing pipeline.

* * * * *